US012661806B2

(12) United States Patent
Gross et al.

(10) Patent No.: US 12,661,806 B2
(45) Date of Patent: Jun. 23, 2026

(54) GRIPPER FOR MOVING PIECE GOODS AND METHODS FOR MOVING PIECE GOODS USING THE GRIPPER

(71) Applicant: Becton Dickinson Rowa Germany GmbH, Kelberg (DE)

(72) Inventors: Dietmar Gross, Kelberg (DE); Christoph Hellenbrand, Kaifenheim (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 1091 days.

(21) Appl. No.: 17/733,249

(22) Filed: Apr. 29, 2022

(65) Prior Publication Data

US 2023/0347529 A1     Nov. 2, 2023

(51) Int. Cl.
*B25J 15/02*       (2006.01)
*B25J 15/00*       (2006.01)
*B25J 15/12*       (2006.01)

(52) U.S. Cl.
CPC ....... *B25J 15/0233* (2013.01); *B25J 15/0033* (2013.01); *B25J 15/12* (2013.01)

(58) Field of Classification Search
CPC ............... B25J 15/0233; B25J 15/0033; B25J 15/12; B65G 47/82; B65G 1/0435
See application file for complete search history.

(56) References Cited

U.S. PATENT DOCUMENTS

| | | | |
|---|---|---|---|
| 4,010,855 A | | 3/1977 | Smith |
| 5,156,514 A | * | 10/1992 | Zah ...................... B65G 1/1378 |
| | | | 414/285 |
| 5,199,531 A | * | 4/1993 | Malin ..................... B66F 9/072 |
| | | | 414/281 |
| 5,199,840 A | * | 4/1993 | Castaldi .............. B65G 1/0435 |
| | | | 414/280 |

(Continued)

FOREIGN PATENT DOCUMENTS

| | | |
|---|---|---|
| DE | 202020106693 U1 | 2/2022 |
| DE | 20202106693 U1 | 4/2022 |

(Continued)

OTHER PUBLICATIONS

WO 2016042442 A1—Google Patents English Translation, 2016.*

(Continued)

*Primary Examiner* — Stephen A Vu
(74) *Attorney, Agent, or Firm* — MASCHOFF BRENNAN

(57)     ABSTRACT

The present disclosure relates to a gripper and a method for moving piece goods. The gripper has a deposit table extending in first and second directions and a gripping assembly guide arrangement having a gripping assembly. The gripping assembly has a unilaterally flexible chain including a bending limitation device, a first end remote from the gripping assembly guide arrangement and a second end close to the gripping assembly guide arrangement. The unilaterally flexible chain is moved and is deflected by a deflection device in an articulation direction at an angle of between 70-110° to the first direction. The unilaterally flexible chain is arranged in such a way that pushing forces are transmitted (Continued)

to a piece good, and the unilaterally flexible chain has an alignment device which, in the non-articulated state, holds the chain links in a mutually non-pivoted, stretched alignment.

19 Claims, 7 Drawing Sheets

(56) References Cited

U.S. PATENT DOCUMENTS

| | | | | |
|---|---|---|---|---|
| 5,213,463 A * | 5/1993 | Rothlisberger | ...... | B65G 1/0435 |
| | | | | 414/280 |
| 6,446,788 B1 | 9/2002 | Leidy et al. | | |
| 8,919,576 B2 | 12/2014 | Chiappini et al. | | |
| 10,518,974 B2 | 12/2019 | Lee et al. | | |
| 2016/0200513 A1 * | 7/2016 | Hellenbrand | ........ | B65G 1/0407 |
| | | | | 414/280 |

FOREIGN PATENT DOCUMENTS

| | | | | |
|---|---|---|---|---|
| EP | 3099604 | | 12/2016 | |
| EP | 3099604 A1 | | 12/2016 | |
| JP | S57189910 A | | 11/1982 | |
| WO | WO2014/090275 A1 | | 6/2014 | |
| WO | WO-2016042442 A1 * | 3/2016 | ........... | B65G 47/842 |

OTHER PUBLICATIONS

European Search Report in Application No. 22170743.3, dated Oct. 17, 2022, 7 pages.

Extended European Search Report for Application No. 22170743.3, dated Oct. 17, 2022, 8 pages including machine translation.

International Search Report and Written Opinion for Application No. PCT/EP2023/057314, dated May 30, 2023, 14 pages including machine translation.

* cited by examiner

GRIPPER FOR MOVING PIECE GOODS AND METHODS FOR MOVING PIECE GOODS USING THE GRIPPER

BACKGROUND

The present disclosure relates to a gripper for moving piece goods and to methods for moving piece goods using the gripper. In particular, the disclosure relates to a gripper for a storage device having horizontal storage surfaces for storing and retrieving piece goods, and to methods for moving piece goods onto and from a gripper.

SUMMARY

One or more embodiments provide a gripper for moving piece goods including a deposit table extending in a first horizontal direction (X direction) and a second horizontal direction (Y direction) which is orthogonal to the first horizontal direction, with at least one storage and retrieval end face extending in the Y direction. The gripper for moving piece goods further including a gripping means guide arrangement which is arranged above the deposit table and has a gripping means which extends in the X direction and is movable in the X direction and has an end portion remote from and close to the gripping means guide arrangement. The gripping means including a first deflection device, a first guide portion extending in the X direction and a second guide portion and, a first unilaterally flexible chain which interacts with the deflection device and has a plurality of chain links with a chain link length KGL. The unilaterally flexible chain including a bending limitation device which limits pivoting of the chain links relative to one another in a first articulation direction GR1 and allows it in a second articulation direction GR2, and the first unilaterally flexible chain having a first end remote from the gripping means guide arrangement and a second end close to the gripping means guide arrangement, characterized in that the unilaterally flexible chain can be moved by means of a drive and can be deflected by means of the deflection device in the second articulation direction at an angle of between 70-110° to the X direction, in that the unilaterally flexible chain is arranged in such a way that, when the gripping means is moved in the X direction, pushing forces can be transmitted to a piece good to be moved onto the deposit table, and in that the unilaterally flexible chain comprises an alignment device which, in the non-articulated state, holds the chain links in a mutually non-pivoted, stretched alignment and secures them against pivoting in the second articulation direction.

The foregoing and other features, aspects and advantages of the disclosed embodiments will become more apparent from the following detailed description and accompanying drawings.

BRIEF DESCRIPTION OF THE DRAWINGS

In the following, one or more embodiments of a gripper and a method according to the disclosure shall be described with reference to the drawings, in which.

DETAILED DESCRIPTION

Figure 1:
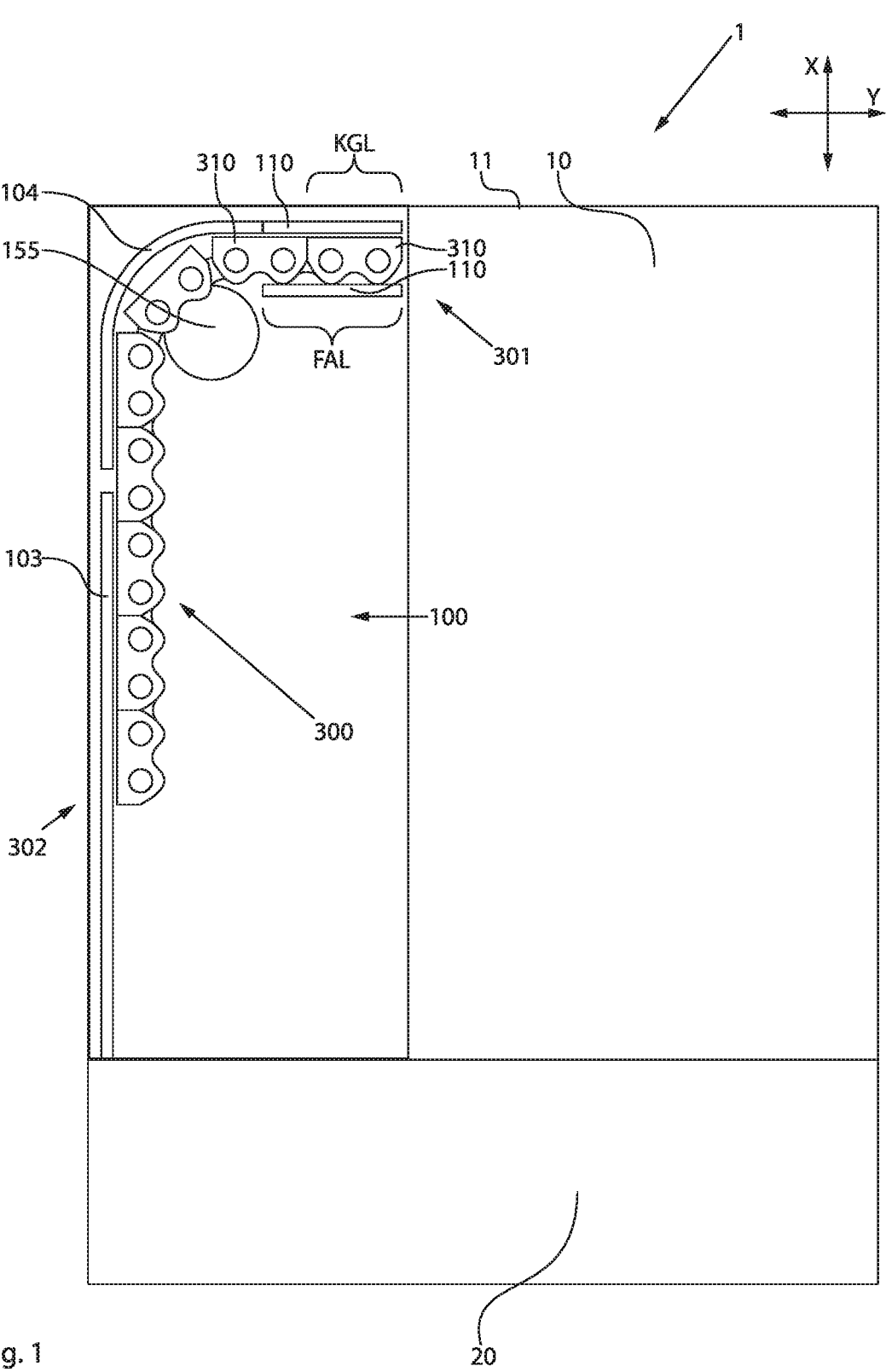
FIG. 1 schematically shows a gripper, according to aspects of the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In order to move piece goods from a storage surface, picking machines, as an example of a storage device for pharmaceutical packages, regularly use grippers which move the piece goods, i.e. the pharmaceutical packages, from the storage surface onto the gripper by clamping the pharmaceutical packages by means of pivotable clamping jaws and then pulling them onto the gripper. The clamping force to be applied by the clamping jaws must exceed the static friction of the pharmaceutical package/storage surface, otherwise the pharmaceutical packages will remain on the storage surfaces. Overcoming the static friction by means of clamps is not problematic in the case of lightweight pharmaceutical packages. In the case of heavy pharmaceutical packages or other heavy piece goods, movement by means of clamps is not possible or possible only with complex mechanisms due to the weight. Clamping as such may also be undesirable since a certain clamping force must necessarily be exerted on the piece good, which is disadvantageous or even impossible in the case of sensitive piece goods.

The object of the present disclosure is to provide a gripper which allows even heavy and/or sensitive piece goods to be moved. It is also the object of the present disclosure to provide methods for moving heavy and sensitive piece goods.

The disclosure is achieved on the one hand by a gripper according to claim 1. The gripper according to the disclosure for moving piece goods comprises a deposit table extending in a first horizontal direction (X direction) and a second horizontal direction (Y direction) which is orthogonal to the first horizontal direction, with at least one storage and retrieval end face extending in the Y direction, and a gripping means guide arrangement which is arranged above the deposit table and has a gripping means which extends in the X direction and is movable in the X direction and has an end portion remote from the gripping means guide arrangement and an end portion close to the gripping means guide arrangement. The mobility of the gripping means can be provided in different ways, for example by moving the gripping means guide arrangement as such in the X direction, for example by means of a linear drive extending in the X direction, or by moving the gripping means or portions thereof, for example by a telescopic design of the gripping means. Grippers having the above-mentioned components and their functionality are known from the prior art.

The gripping means of the gripper according to the disclosure comprises a first deflection device, a first guide portion extending in the X direction and a second guide portion, as well as a first unilaterally flexible chain which interacts with the deflection device and the guide portions and has a plurality of chain links with a chain link length KGL, the unilaterally flexible chain comprising a bending limitation device which limits pivoting of the chain links relative to one another in a first articulation direction and allows it in a second articulation direction, and the first unilaterally flexible chain having a first end remote from the gripping means guide arrangement and a second end close to the gripping means guide arrangement.

According to the disclosure, the unilaterally flexible chain can be moved by means of a drive and can be deflected by means of the deflection device in the second articulation direction at an angle of between 70-110° to the X direction, and the unilaterally flexible chain is arranged in such a way that, when the gripping means is moved in the X direction, pushing forces can be transmitted to a piece good to be moved onto the deposit table, and the unilaterally flexible chain has an alignment device which, in the non-articulated state, holds the chain links in a mutually non-pivoted, stretched alignment and secures them against pivoting in the second articulation direction.

A single-sided flexible chain, also known as a push chain or back-stiff chain, is a special product in linear drive technology. A push chain consists of specially formed, high-precision mechanical chain links. The chain links are designed in such a way that pivoting of the chain links is possible only to a limited extent in a first articulation direction (the non-flexible "side" of the chain), but is permitted in the second articulation direction (the flexible "side" or direction). These chains are usually constructed in such a way that the chain links can only be pivoted so far in relation to the non-flexible side that a stretched, straight chain can be formed. Exactly how the limitation of the pivoting is achieved depends on the exact structure of the chain; in this case the device used for this purpose is referred to as a bending limitation device. A more detailed description of the general structure and the general mode of operation of these chains will not be given since these are known to a person skilled in the art. Only those details that are essential to the present disclosure and that may differ from known chains are described.

In the gripper according to the disclosure, the first unilaterally flexible chain can be deflected by means of a chain drive and by means of the first deflection device at an angle of between 70-110° to the X direction. In order to prevent the unilaterally flexible chain from assuming an "arbitrary" orientation after "leaving" the deflection device, for example rolling up in the second articulation direction, according to the disclosure the chain comprises the above-mentioned alignment device, and this ensures that the chain remains linearly aligned after "leaving" the deflection device.

The gripper according to the disclosure makes it possible to push piece goods onto the deposit table (from the "point of view" of the chain, although from the overall view of the gripper this is more of a pulling action). However, since a pushing chain portion is flexible when a compressive force is exerted on the side remote from the storage and retrieval end face (i.e. the back) (the chain portion can therefore be pivoted further in the second articulation direction), no piece goods can be pushed onto a storage surface using a corresponding gripper.

According to the disclosure, an alignment device is provided for the gripper and holds the unilaterally flexible chain in a stretched, non-pivoted alignment in the non-articulated state, i.e. when it is moved or extended over the deposit table. In one embodiment, the alignment device of the unilaterally flexible chain is designed as a spring element that extends through the chain and presses the chain links in the first articulation direction against the bending limitation device. A corresponding design of the alignment device is technically simple and requires only minor modifications to "conventional" unilaterally flexible chains.

In an alternative embodiment, the alignment device is formed by a plurality of latching arms with latching lugs and latching receptacles, wherein a latching arm of one chain link can interact with a latching receptacle of an adjacent chain link and interacting latching arms and latching receptacles align the corresponding chain links in a stretched manner. In order to ensure the alignment of the chain links, the chain links must be locked before moving the chain portion over the deposit table. For this purpose, in this embodiment the second guide portion is designed in such a way that it causes adjacent chain links to lock. Depending on the exact configuration of the latching means (latching arms, latching lugs, latching receptacles), this can be achieved for example by the second guide portion being longer than a chain link length.

With the gripper according to the disclosure, it is not possible to push heavy piece goods from the deposit table to a storage location for the reasons mentioned above (the unilaterally flexible chain is flexible in the pushing direction from the deposit surface over the storage and retrieval end face, the chain links can pivot in the second articulation direction). A piece good can be pushed from the deposit table to a storage location using an additional device of the gripper.

In one or more embodiments of the gripper in which piece goods can also be pushed from the deposit table with the aid of the first flexible chain, the gripper has a second gripping means, the second gripping means having a receiving device which can be detachably connected to the first end of the first unilaterally flexible chain in such a way that a pushing force (from the "point of view" of the chain) is transmitted to the piece good when the gripping means are moved in the X direction toward the storage and retrieval end face.

By providing a detachable connection to the receiving device, a rigid and pressure-resistant connection is provided in both directions (in relation to the storage and retrieval end face), which can also be used to transmit greater forces, i.e. even heavy piece goods can be moved from a storage surface onto the gripper and from the gripper onto a storage surface.

Another significant advantage of the disclosure is that the structure of the gripping means is relatively simple and the chain as such can be stored in a "space-saving" manner in the X direction of the gripping means. The gripping means itself can also be slim, which is essential for a narrow and thus space-saving storage of piece goods on a storage surface with defined dimensions. Furthermore, the components are very robust; frequent maintenance and rapid wear are not to be expected.

In order to be able to use the full length of the gripping means, in one or more embodiments the first deflection device and the receiving device are arranged at the end portions of the gripping means that are remote from the gripping means guide arrangement.

By moving the gripping means in the X direction toward the deposit table of the gripper, one or more piece goods are moved onto the deposit table. In the case of maximum "movement" of the gripping means (in the X direction), the positioning of the deflection device and the receiving device on the gripping means defines the deposition location of the piece good(s) on the deposit table. When the deflection device and the receiving device are thus arranged in the end portions remote from the gripping means guide arrangement, a piece good is positioned close to the storage and retrieval end face. However, this may be a non-optimal or even unusable position for the further handling of the piece good. Furthermore, this arrangement does not readily (i.e. not without the provision of further components) allow piece goods to be moved from the deposit table onto a storage surface with the unilaterally flexible chain.

In order to make it possible, among other things, to arrange a piece good in different positions on the deposit table, according to one or more embodiments the first deflection device and/or the receiving device can each be moved by means of a drive in the X direction on or at the relevant gripping means. Such mobility also allows piece goods to be moved from the gripper onto e.g. a storage surface with the aid of the first flexible chain, which will become clear in the description of the methods below.

The receiving device can be designed or realized in various ways as long as its function is ensured, namely to enter into a detachable connection with the first end of the first unilaterally flexible chain so that a pushing force is transmitted to a piece good when the gripping means are moved in the X direction toward the storage and retrieval end face. In a structurally simple embodiment, the receiving device comprises an opening for receiving the first end of the first chain, the opening preferably having a depth which is greater than a chain link length.

In an alternative embodiment, the receiving device is provided by a first end of a second unilaterally flexible chain which interacts with a second deflection device and can be moved by means of a second chain drive and can be deflected by means of the second deflection device at an angle of between 70-110° to the X direction, as a result of which the first end of the second chain can be moved into the space between the gripping means and the first ends of the chains can be detachably interconnected such that a pushing force is transmitted to the storage and retrieval end face when the gripping means are moved in the X direction.

In this embodiment, the two gripping means have the same components, which are (arranged to be) mirror-symmetrical to one another. In this case, the receiving device is provided by all of the aforementioned components.

Such an embodiment is particularly useful when the possible distances between the gripping means can be great—in this way, it is still possible to use relatively short chains, as these only have to bridge half of the space in each case. The exact manner of the detachable connection between the ends of the chains depends on the individual case—in the simplest case a simple rigid male/female connection can be used.

As described above, it can be the case that the deflection devices or a deflection device and the receiving device can be moved in the X direction along the gripping means. However, the freedom of movement of a deflection device is limited by the chain length as such, at least when the chain is not received in the gripping means guide arrangement when the deflection device is moved toward the end portion of the gripping means that is close to the gripping means guide device. In order to allow a wide range of motion during the movement of the deflection device(s), according to one or more embodiments a gripping means having a deflection device at the end portion remote from the gripping means guide arrangement has a further deflection device at the end portion close to the gripping means guide arrangement, with a unilaterally flexible chain being deflectable from the X direction, preferably at an angle <90°, by means of the further deflection device, as a result of which the second end of a chain can be moved over the deposit table.

The object is also achieved by a method for moving piece goods onto a gripper according to the disclosure, wherein the gripper is moved toward a storage surface associated with a piece good to be retrieved, at least one gripping means is moved in the X direction toward the storage surface so that the piece good is arranged next to a gripping means, and the first unilaterally flexible chain is moved by means of the associated chain drive in such a way that the first end is extended by the first deflection device remote from the gripping means guide arrangement at an angle of between 70-110° to the X direction, wherein adjacent chain links downstream of the deflection device remote from the gripping means guide arrangement are brought into a mutually non-pivoted, stretched alignment so that a stretched portion of the unilaterally flexible chain is moved behind the piece good in such a way that the piece good is arranged between the stretched portion of the chain and the deposit surface. Finally, the at least one gripping means is moved in the X direction toward the deposit table, with the stretched portion of the first unilaterally flexible chain pushing the piece good onto the deposit table.

As already explained above, with a gripper having only one gripping means, it is possible only to push piece goods onto the gripper—due to the properties of the unilaterally flexible chain it cannot be used to push the piece good from the gripper onto a storage surface.

In one or more embodiments of the method which, however, can be carried out only using a gripper having two gripping means, the gripper is moved toward a storage surface associated with a piece good to be retrieved, the gripping means are moved in the X direction toward the storage surface so that the piece good is arranged between them, and the first unilaterally flexible chain is moved by means of the associated chain drive in such a way that the first end is extended by the first deflection device remote from the gripping means guide arrangement at an angle of between 70-110° to the X direction, wherein adjacent chain links downstream of the deflection device remote from the gripping means guide arrangement are brought into a mutually non-pivoted, stretched alignment so that a stretched portion of the unilaterally flexible chain is moved behind the piece good in such a way that the piece good is arranged between the stretched portion of the chain and the deposit table. The first end of the first chain is then detachably connected to the receiving device of the second gripping means in such a way that pushing forces can be transmitted to the piece good when the gripping means are moved in the X direction toward the storage and retrieval end face. Finally, the gripping means are moved in the X direction toward the deposit table so that the piece good is pushed onto the deposit table of the gripper.

In one or more embodiments, the first end of the chain is detachably connected to the receiving device by moving the second unilaterally flexible chain by means of the associated chain drive in such a way that the first end of the second chain is moved into the space between the gripping means by the second deflection device remote from the gripping means guide arrangement, and the first ends of the chains are detachably interconnected in such a way that a pushing force is transmitted to a piece good when the gripping means are moved in the X direction toward the storage and retrieval end face.

Depending on the exact configuration of the gripper, a piece good can also be pushed from the gripper onto a storage surface using the flexible chains. For this purpose, the deflection devices remote from the gripping means guide arrangement or a corresponding deflection device and the receiving device are moved toward the end portions of the gripping means that are close to the gripping means guide arrangement. The first unilaterally flexible chain is then moved by means of the associated chain drive in such a way that the first free end is moved by the first deflection device remote from the gripping means guide arrangement into the space between the gripping means, namely behind—with respect to the storage and retrieval end face—the piece good to be moved, and the first free end of the first chain is detachably connected to the receiving device of the second gripping means in such a way that a pushing force can be transmitted to the piece good when the gripping means are moved in the X direction toward the storage and retrieval end face, and then the gripping means are moved in the X direction over the storage and retrieval end face so that the piece good is moved from the supporting table of the gripper.

FIG. 1 schematically shows a gripper 1 according to the disclosure. This gripper 1 comprises a gripping assembly 100 which is fastened to a gripping assembly guide arrangement 20 which in turn is arranged above a deposit table 10 of the gripper 1. The deposit table 10 extends in a first horizontal direction X and a second horizontal direction Y that is orthogonal to the first horizontal direction X, and comprises a storage and retrieval end face 11 extending in the Y direction. The gripping assembly 100 itself can be moved in the X direction, and this mobility can be provided by the gripping assembly guide arrangement 20. In aspects of the disclosure, it is also conceivable for the gripping assembly 100 to be telescopic, i.e. only a portion of the gripping assembly 100 can be moved in the X direction. In this context, reference is made to the description of FIGS. 7a and 7b, which describes aspects in which the mobility of the gripping assembly 100 is described in more detail.

The gripping assembly 100 comprises a deflection device 104 and a chain drive 155. Furthermore, the gripping assembly 100 comprises a first guide portion 103 extending in the X direction and a second guide portion 110 for a first end 301 of a unilaterally flexible chain 300. The unilaterally flexible chain 300 is moved by a movement of the chain drive 155 and deflected from the X direction to the Y direction using the deflection device 104, and as shown in FIG. 1, the deflection is at an angle of 90°, i.e. from the X to the Y direction. In aspects of the disclosure, the angle can be between 70-110°, and proper movement of piece goods is possible even at such angles. As will be described in more detail below, the piece goods are pushed onto the deposit table 10 using the unilaterally flexible chain 300 (e.g., from the point of view of the chain 300). Since the unilaterally flexible chain 300 comprises a bending limitation device 320, 321 that limits pivoting of the chain links 310 relative to one another in a first articulation direction GR1 and allows it in a second articulation direction GR2 (see FIG. 2c), corresponding pushing forces can be transmitted. A more detailed description of the unilaterally flexible chain 300 and the bending limiting device 320, 321 is made with reference to subsequent figures.

As has already been explained above, the unilaterally flexible chain 300 comprises an alignment device which, in the non-articulated state, holds the chain links 310 in a mutually non-pivoted, stretched alignment and secures them against pivoting in the second articulation direction GR2. Two examples of an alignment device are described in more detail below. In aspects of the disclosure, it is essential that adjacent chain links 310 of the unilaterally flexible chain 300 are locked after the deflection. For this purpose, as shown in FIG. 1, the length FAL of the second guide portion 110 is greater than a chain link length KGL. In the guide portion 110 shown, which is formed by two parallel second guide portions 110, two adjacent chain links 310 are aligned with one another and locked, and after deflection the chain links 310 are therefore are no longer freely movable, but are moved in a defined direction (e.g., the chain 300 is almost rigid after locking, but this rigidity can be removed again by applying a certain force). In one or more aspects of the disclosure, this rigidity may be achieved in other ways, as discussed below.

With the gripper 1, according to aspects of the disclosure, even heavy piece goods can be pushed from a storage surface 3 onto the gripper 1, but the piece good 2 cannot be moved from the gripper 1 without further devices or components, since even with a deflection device (not shown) that can be moved in the X direction and movement behind a piece good 2 (also not shown), this piece good 2 cannot be pushed from bottom to top since the chain 300 is not rigid but flexible in this direction X.

FIGS. 2a-2d are detailed views of a unilaterally flexible chain 300 of the gripper 1 according to aspects of the disclosure. As shown, the individual chain links 310 each comprise two articulation openings 312 into which articulation extensions 311 of an adjacent chain link 310 engage.

Figures 2A, 2B, 2C, 2D:
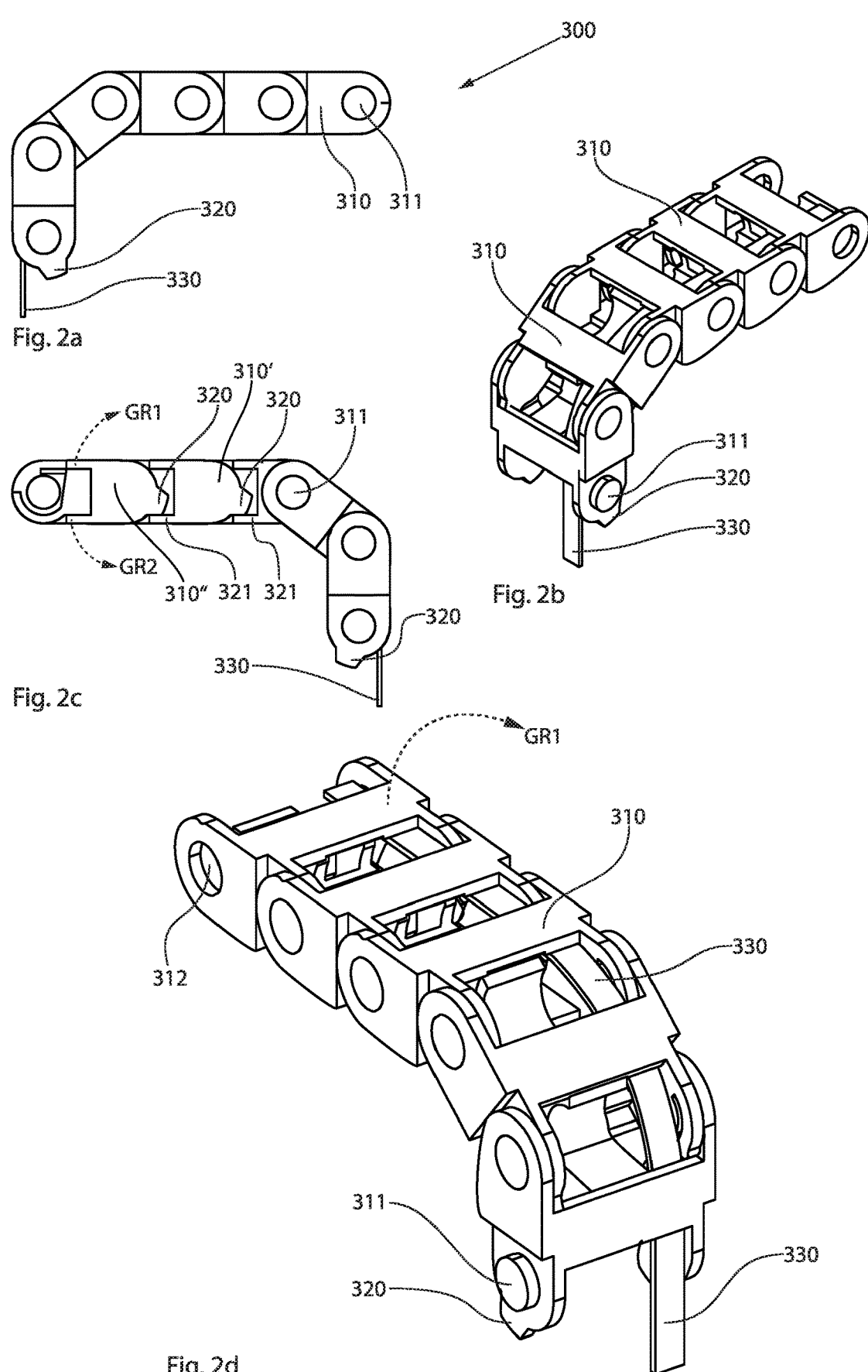
FIGS. 2*a*-2*d* are detailed views of a unilaterally flexible chain of a gripper, according to aspects of the disclosure.
Figure 3A:
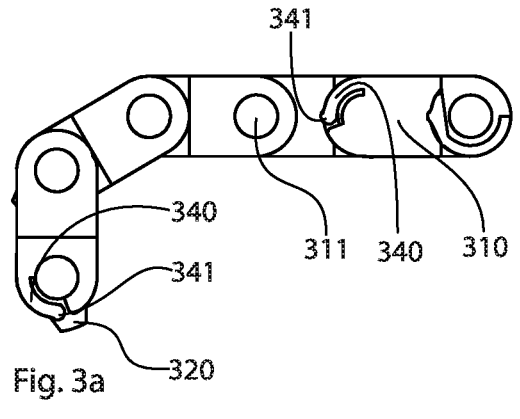
FIGS. 3*a*-3*e* are detailed views of a unilaterally flexible chain of a gripper, according to aspects of the disclosure.
Figure 3B:
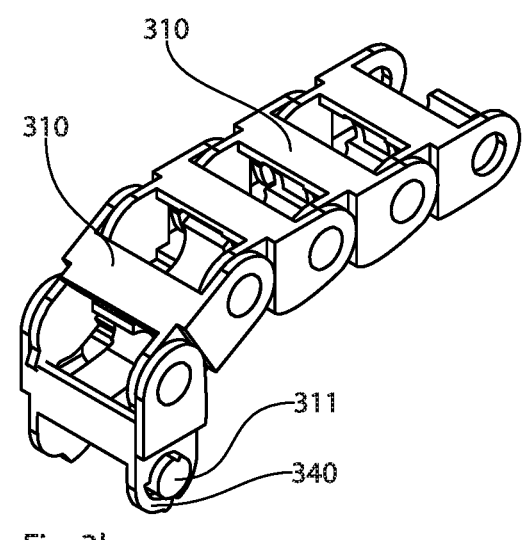
Figure 3C:
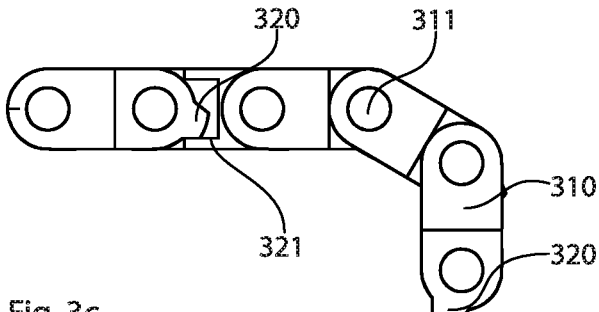
Figure 3D:
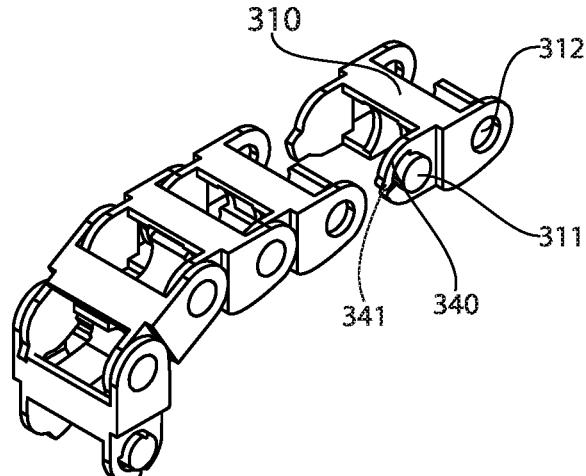
Figure 3E:
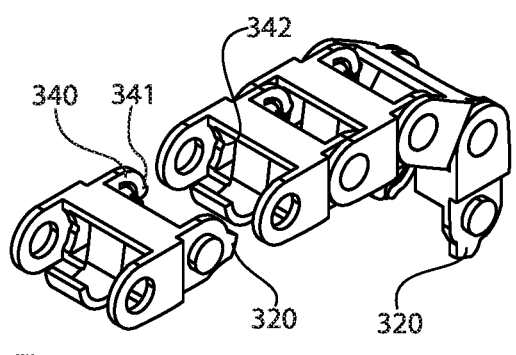

As already mentioned, the unilaterally flexible chain 300 used in the gripper 1 comprises a bending limitation device that limits pivoting of the chain links 310 relative to one another in a first articulation direction GR1 and allows it in a second articulation direction GR2. As shown in FIGS. 2a-2d, this bending limitation device is formed by two components of adjacent chain links 310. Those chain links 310 in which pivoting in the first articulation direction GR1 must be limited comprise a projection 320 which interacts with a stop 321 of an adjacent chain link 310. As can be seen in FIG. 2c, the stop 321 of the chain link 310' limits further pivoting of the chain link 310" in the articulation direction GR1 since the projection 320 of the chain link 310" abuts the stop 321 of the chain link 310'. What cannot be seen in FIG. 2c is that opposite the stop 321 there is no corresponding stop that limits pivoting of the projection 320.

The unilaterally flexible chain 300 of the gripper 1 also comprises an alignment device which, in the non-articulated state, holds the chain links 310 in a mutually non-pivoted, stretched alignment and secures them against pivoting in the second articulation direction GR2. As shown, this alignment device is designed as a spring element 330 that extends through the chain 300 and presses the chain links 310 against the bending limitation device 320, 321 in the first articulation direction GR1. This is illustrated in each case in the upper stretched portions of the figures. The alignment device thus ensures that the chain 300 is aligned linearly in the non-articulated state and has a certain rigidity which is defined by the spring force of the spring element 330.

FIGS. 3a-3e are detailed views of one or more aspects of the unilaterally flexible chain 300 of the gripper 1 according to the disclosure, in which the alignment device is formed by a plurality of latching arms 340 with latching lugs 341 and latching receptacles 342, wherein a latching arm 340 of one chain link 310 can interact with a latching receptacle 342 of an adjacent chain link 310. Here, interacting latching arms 340 and latching receptacles 342 align the corresponding chain links 310 in a stretched manner. In order to initiate the locking, adjacent chain links 310 must be linearly aligned with one another so that, in aspects of the disclosure, it is also necessary for the second guide portion 103 of the gripping assembly 100 to be designed in such a way that it causes adjacent chain links 310 to lock. This is shown and described for example aspects of the disclosure according to FIG. 1.

Figure 4A:
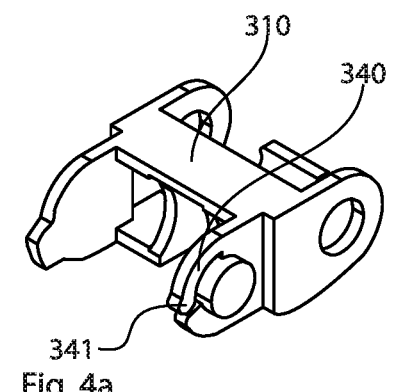
FIGS. 4*a* and 4*b* are detailed views of a chain link of the unilaterally flexible chain of FIGS. 3*a*-3*e*, according to aspects of the disclosure.
Figure 4B:
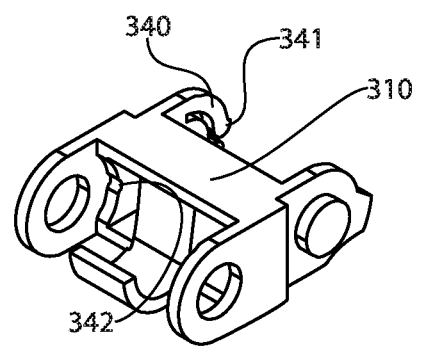

FIGS. 4a and 4b show a detailed view of a chain link 310 of the unilaterally flexible chain 300 of FIGS. 3a-3e. FIG. 4a shows the latching arm 340 together with the latching lug 341 and FIG. 4b shows the latching receptacle 342. The figures also show the projection of the bending limitation device 320, 321 (See FIG. 3c), which is designed as shown in FIG. 2c.

Figures 5, 6:
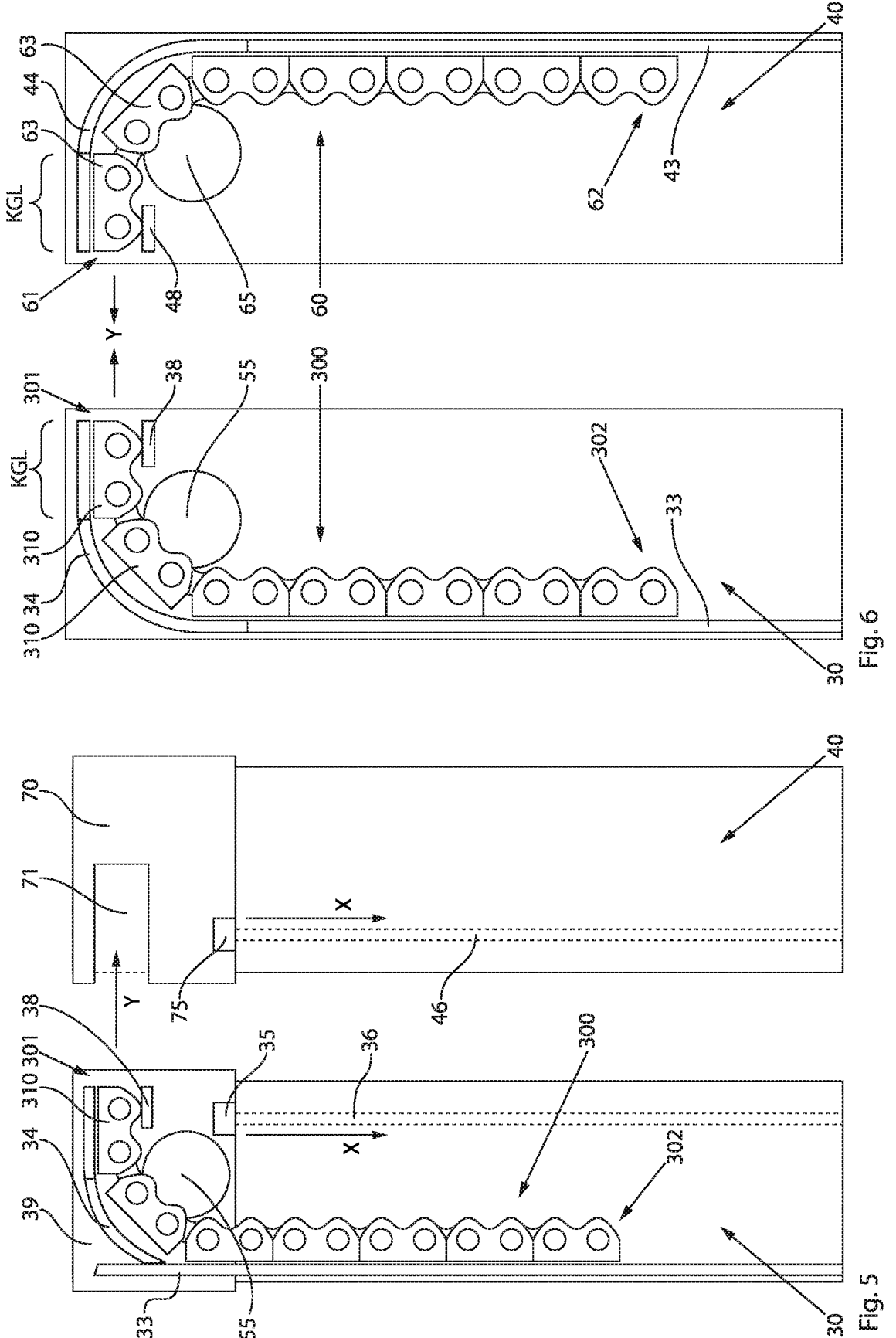
FIG. 5 is a detailed view of portions of gripping assemblies of a gripper, according to aspects of the disclosure.
FIG. 6 is a detailed view of portions of gripping assemblies of a gripper, according to aspects of the disclosure.

FIG. 5 is a detailed view of portions of gripping assemblies 30, 40 of a gripper 1 according to aspects of the disclosure. Here, the two gripping assemblies 30, 40 are not of mirror-symmetrical identical construction, but rather only the left gripping assembly 30 comprises a chain 300 as well as further components described above. Here, a deflection device 34 and a second guide portion 38 can be moved in the longitudinal direction of the gripping assembly 30 (i.e. in the X direction). As shown, the deflection device 34 and the second guide portion 38 are arranged on a carriage 39 for this purpose. This carriage 39 further comprises a drive 35 which interacts with a linear guide 36 (shown in dashed lines) for moving the carriage 39. As shown, a chain drive 55 is also arranged on the carriage 39. Due to the mobility of the carriage 39, a first guide portion 33 of is constructed and arranged slightly differently than shown in FIG. 1.

The second gripping assembly 40 comprises a receiving device that is not realized by a mirror-symmetrical assembly of the gripping assembly 30, but rather as a carriage 70 that can be moved in the X direction and has an opening 71 that can receive a chain link 310 of the first end 301 of the first chain 300. Preferably, the depth of the opening 71 is greater than a length of a chain link 310, as is also shown. The carriage 70 further comprises a drive 75 which interacts with a linear guide 46 for moving the carriage 70 in the X direction.

FIG. 6 is a detailed view of portions of gripping assemblies 30, 40 of a gripper 1 according to aspects of the disclosure. Here, the two gripping assemblies 30, 40 have a mirror-symmetrical structure, i.e. they have the same components in a corresponding alignment. FIG. 6 shows in particular the alignment or arrangement of the two unilaterally flexible chains 300, 60. The two unilaterally flexible chains 300, 60 are again shown only schematically in FIG. 6. The exact structure of the chains 300, 60 to be used may correspond to those shown in FIGS. 2a-3e, for example. The first guide portions 33, 43 of the gripping assemblies 30, 40 are intended to ensure that the portions of the chains 300, 60 extending in the X direction do not move freely inward; they could thus also be arranged inward on the side of the corrugated side surfaces of the chain links 310, 63.

Figures 7A, 7B:
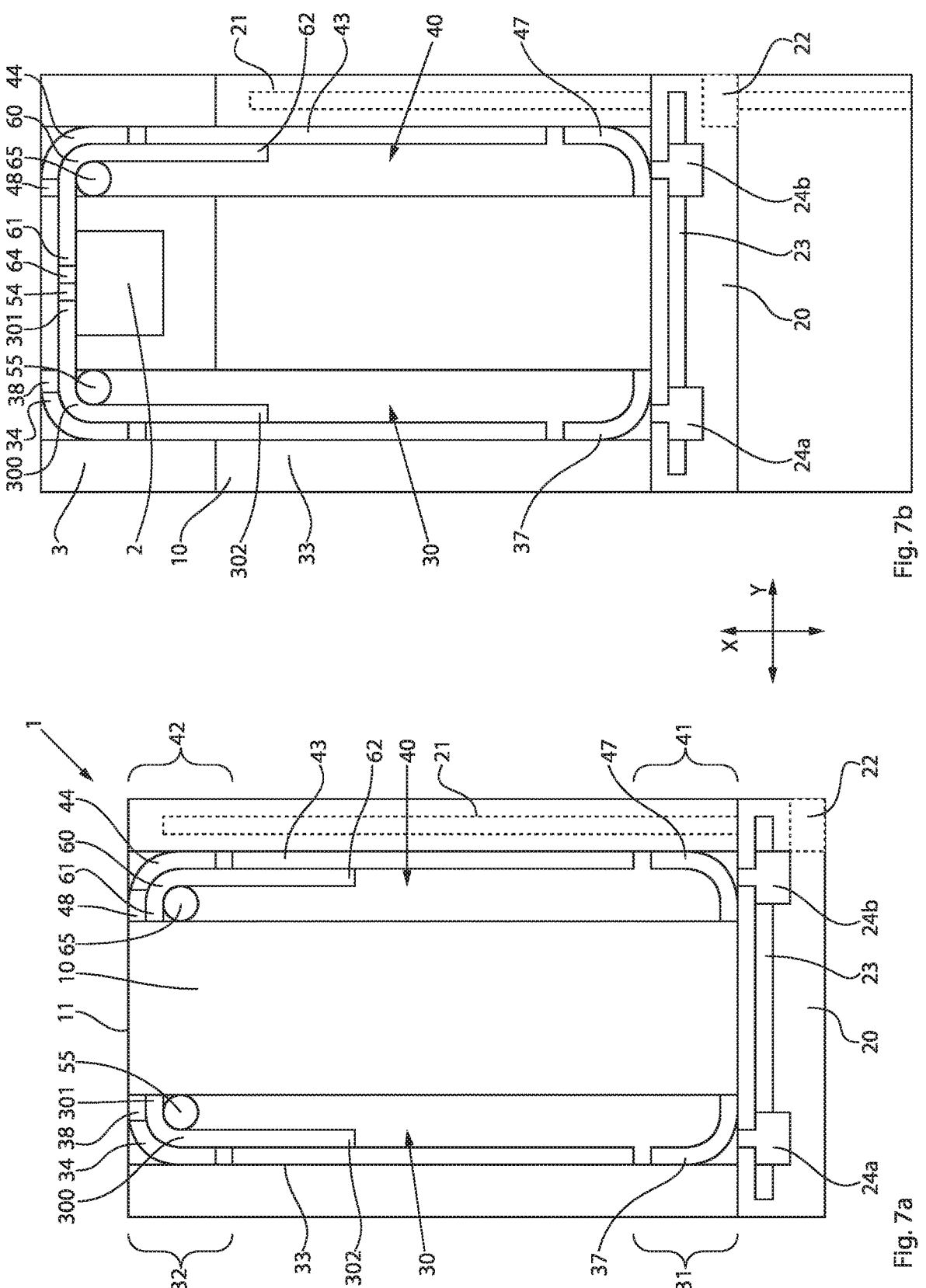
FIG. 7*a* is a schematic plan view of a gripper, according to aspects of the disclosure.
FIG. 7*b* is a schematic plan view of a gripper, according to aspects of the disclosure.

FIGS. 7a and 7b are schematic plan views of aspects of a gripper 1, with the gripper 1 according to the disclosure being described in detail again with reference to these figures.

The gripper 1 comprises a deposit table 10 extending in an X direction and a Y direction which is orthogonal to the X direction, with a storage and retrieval end face 11. The gripper 1 further comprises a gripping assembly guide arrangement 20 having a drive 22 which interacts with a linear guide 21 (indicated by dashed lines) in order to move the gripping assembly guide arrangement 20 in the X direction. As shown, the gripping assembly guide arrangement 20 comprises two gripping assemblies 30, 40 which can be moved in the Y direction along a linear guide 23 by a drive 24a, 24b, so that the distance between the gripping assemblies 30, 40 can be adapted to piece goods and the distances between them can be adjusted.

The two gripping assemblies 30, 40 are mirror-symmetrical in both FIGS. 7a and 7b, and each comprise an end portion 31, 41 close to the gripping assembly guide arrangement 20 and an end portion 32, 42 remote from the gripping assembly guide arrangement 20. A deflection device 34, 44 is arranged on each of the end portions 32, 42 remote from the gripping assembly guide arrangement 20, by which device a unilaterally flexible chain 300, 60 (also referred to simply as a chain below) of a gripping assembly 30, 40 can be deflected into the space between the gripping assemblies 30, 40, specifically at an angle of between 70-110° based on the X direction. The chains 300, 60 each have a first end 301, 61 remote from the gripping assembly guide arrangement 20 and a second end 302, 62 close to the gripping assembly guide arrangement 20.

A chain drive 55, 65, which interacts with a chain 300, 60 and by which the chains 300, 60 can be moved in the X direction along a gripping assembly 30, 40 is arranged at each of the deflection devices 34, 44. Using the deflection devices, this movement in the X direction is deflected into a movement in the Y direction so that the chain drives deflect the first ends 301, 61 into the space between the gripping assemblies 30, 40. The chain drives 55, 65 (like all the components), which are only indicated schematically, can simply comprise a chain gear interacting with the chains 300, 60, and a rotary drive. In aspects of the disclosure, the chain drives 55, 65 can be arranged at a different location or, if necessary, can be designed completely differently. For example, a chain link 310 can be connected to a driver that moves in the X direction, which in turn is moved on a linear guide.

The chains 300, 60 themselves are guided along a first guide portion 33, 43 in order to prevent the chains 300, 60 from moving freely and possibly getting caught or swinging arbitrarily with the second end 302, 62 into the space between the gripping assemblies 30, 40. How exactly the first guide portion 33, 34 is designed depends on the design of the gripping assemblies 30, 40 themselves.

In addition to the first guide portion 33, 43, each of the two gripping assemblies 30, 40 also has a second guide portion 38, 48, the orientation of which determines how the chains are guided into the space between the gripping assemblies 30, 40. In addition, depending on the exact design of the unilaterally flexible chains 300, 60, the second guide portions 38, 48 can also have the task of locking the chain links 310, 63 of the chains 300, 60 after deflection, which has already been described in more detail with reference to previous figures.

FIG. 7b shows the gripper 1 with extended gripping assemblies 30, 40. The gripping assemblies 30, 40 are moved in the X direction toward a storage surface 3 next to a piece good 2. It is also indicated that the two chains 300, 60 are moved into the space between the gripping assemblies 30, 40. In the case of the mutually facing first ends 301, 61 of the chains 300, 60, coupling pieces 54, 64 by which the two ends 301, 61 are detachably connected are shown in FIG. 7b. In the simplest case, a detachable, rigid male/female connection can be established. As can be seen, the two chains 300, 60 grip the piece good 2 from behind (in relation to the direction of the piece good 2/storage and retrieval end face 11). Since the chains 300, 60 are only unilaterally flexible (see description of FIG. 2a-3e), the free portions moved between the gripping assemblies 30, 40 (also due to the connection) cannot be moved upward when the gripping assemblies 30, 40 are moved back toward the deposit table 10. During this movement, the chains 300, 60 can then exert a pushing force on the piece good 2 (from the point of view of the chains 300, 60).

Further deflection devices 37, 47 are indicated at the end portions 31, 41 of the gripping assemblies 30, 40 that are close to the gripping assembly guide arrangement 20, which devices act in the same way as the gripping assemblies 30, 40 at the remote end portions, except that they deflect the second ends 302, 62 of the chains into the space between the gripping assemblies 30, 40. Why this is useful and necessary is explained in one of the following figures.

Figures 8A, 8B, 8C:
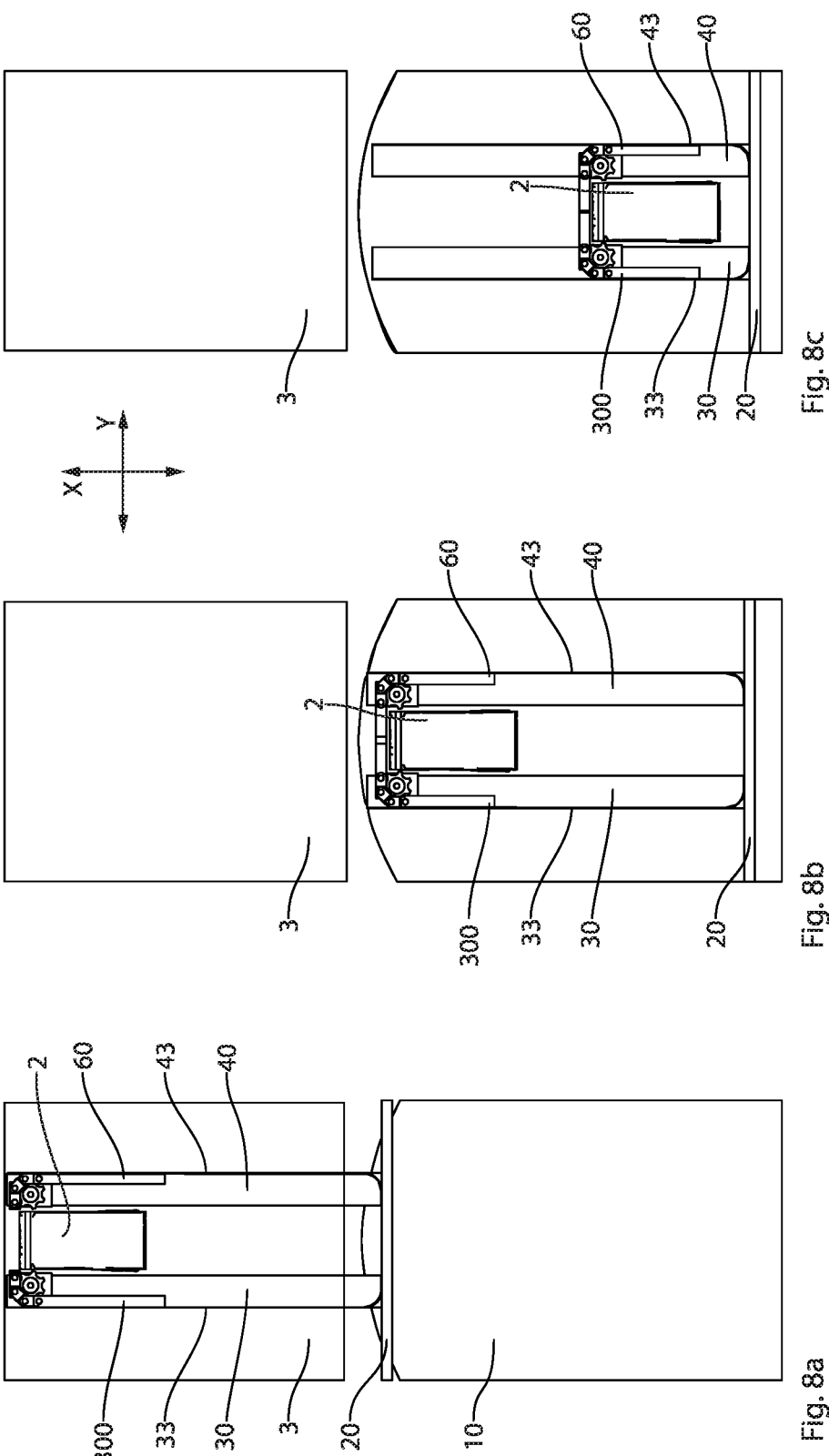
FIGS. 8*a*-8*c* show different stages of a method for moving a piece good onto a gripper, according to aspects of the disclosure.

FIG. 8a-8c show different stages of a method for moving a piece good 2 onto a gripper 1 according to the disclosure, wherein the illustrated gripper 1 has two mirror-symmetrically constructed gripping assemblies 30, 40 each having a unilaterally flexible chain 300, 60. Furthermore, the deflection devices, which are not explicitly shown but are constructed in accordance with those described above, can be moved in the X direction, as is described with reference to FIG. 5 with the carriage 39. The gripping assembly guide arrangement 20 is shown only schematically, and other components of the gripper 1 are completely omitted. FIG. 8a-8c (and also the following FIG. 9a-9c) are only intended to schematically illustrate the method for moving piece goods 2 onto and from a gripper 1.

In FIG. 8a, the gripping assemblies 30, 40 are moved in the X direction toward the storage surface 3 next to the piece good 2. The chains 300, 60 are then extended and connected, i.e. the chains 300, 60 are moved via the deflection devices into the space between the gripping assemblies 30, 40, are detachably connected and grip the piece good 2 from behind (viewed from the storage surface 3/deposit table 10 of the gripper 1). After gripping the piece good 2 from behind (by deflecting the first ends of the chains 300, 60 between the gripping assemblies 30, 40 and detachably connecting coupling assemblies that are not shown here), the gripping assemblies 30, 40 are moved in the X direction toward the deposit table 10, as a result of which the chains 300, 60 exert a pushing force on the piece good 2 and push it onto the deposit table 10 as shown in FIG. 8b.

FIG. 8b shows the position which is the end position in which the deflection devices cannot be moved in the X direction. In the present case, however, the deflection devices are movable, as shown in FIG. 8c. The deflection devices are moved further in the X direction toward the gripping assembly guide arrangement 20, as a result of which the piece good 2 is moved in the X direction toward the gripping assembly guide arrangement 20.

Figure 9C:
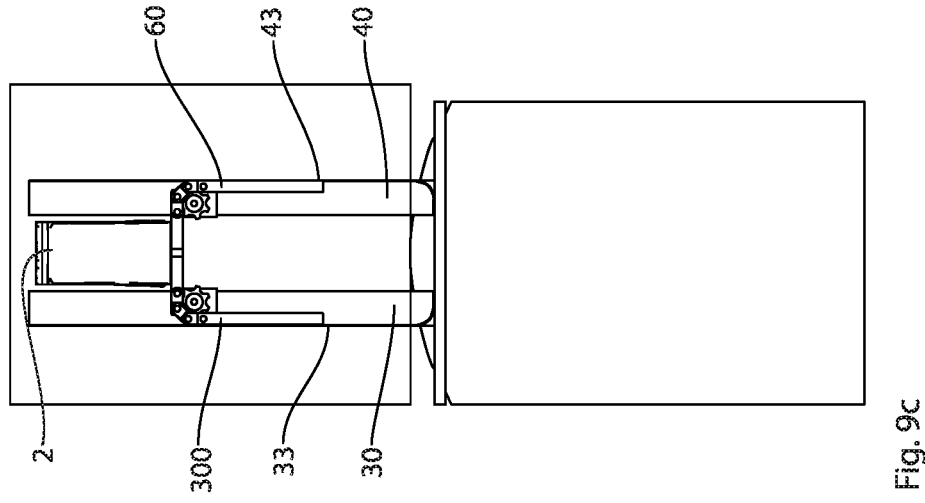
FIGS. 9*a*-9*c* show different stages of a method for moving a piece good from a gripper, according to aspects of the disclosure.
Figure 9B:
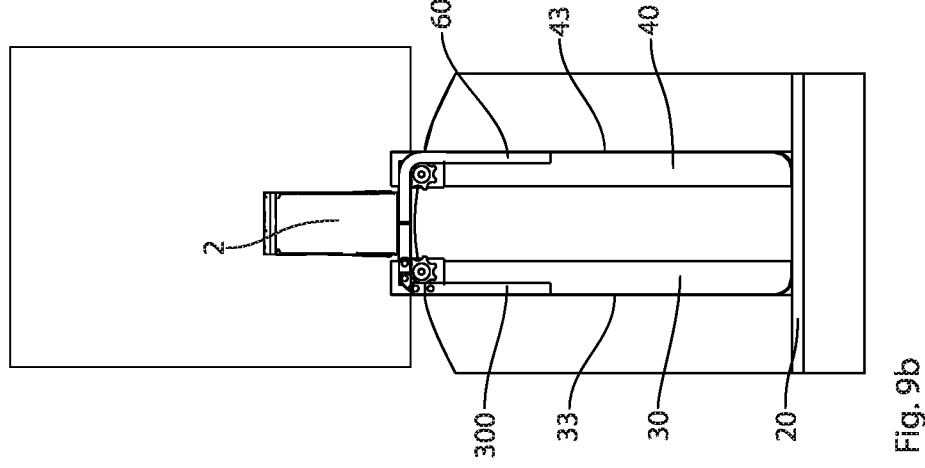
Figure 9A:
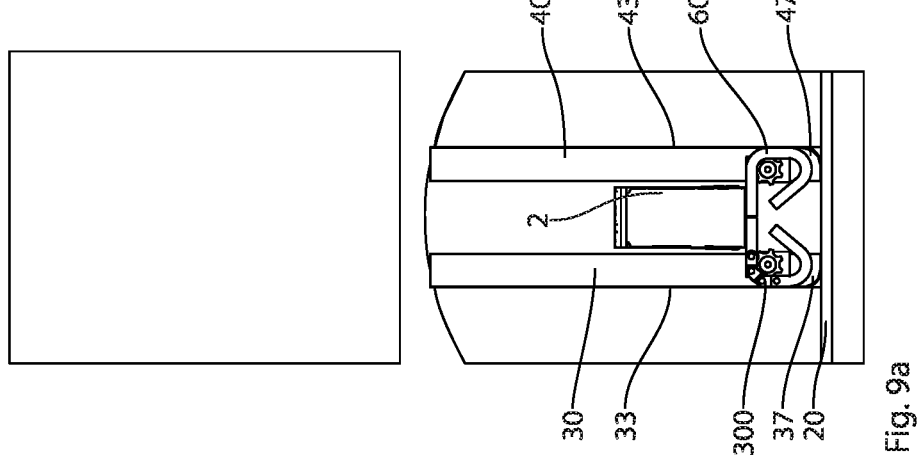

FIG. 9a-9c show different stages of a method for moving a piece good 2 from a gripper 1, according to the disclosure, onto e.g. a storage surface 3, with this movement being performed using the gripping assemblies 30, 40 and the chains 300, 60. In the gripper 1 shown in FIG. 8a-8c and 9a-9c, the gripping assemblies 30, 40 have further deflection devices 37, 47 at the end portions 31, 41 of the gripping assemblies 30, 40 that are close to the gripping assembly guide arrangement 20, which devices are designed in such a way that they guide the second ends 302, 62 of the chains 300, 60 into the space between the gripping assemblies 30, 40, as illustrated in FIG. 9a.

In order to push a piece good 2 from the deposit table 10, it must be gripped again from behind (based on the view from the gripping assembly guide device/storage and retrieval end face 11). For this purpose, the deflection devices that can be moved in the X direction (for example starting from the position in FIG. 8c) must be brought further toward the gripping assembly guide arrangement 20 and behind (according to FIG. 9a "below") the piece good 2. In order not to move the piece good 2 in the process, it is necessary to loosen the first ends 301, 61 of the chains 300, 60 and retract the chains 300, 60 if this has not already happened. The retraction results in the portions of the chains 300, 60 that are arranged in parallel with the gripping assemblies 30, 40 in the X direction being lengthened. The further deflection devices then guide the second ends 302, 62 of the chains 300, 60 into the space between the gripping assemblies 30, 40. Depending on the length of the chains 300, 60 and the position of the first and the second deflection device, this occurs as soon as the retraction happens or only when the first and the second deflection device are moved further below or behind the piece good 2 to be moved.

When the deflection devices are moved to the appropriate positions, the chains 300, 60 are moved using the associated chain drives in such a way that the first ends 301, 61 are moved into the space between the gripping assemblies 30, 40, namely below the piece good 2, by the first and the second deflection devices remote from the gripping assembly guide arrangement 20. The first ends 301, 61 of the chains 300, 60 are then detachably interconnected in such a way that pushing forces can be transmitted from the chains 300, 60 to the piece good 2 when the gripping assemblies 30, 40 are moved in the X direction toward the storage and retrieval end face 11. During this pushing movement, a connection of the ends of the chains 300, 60 is essential, since the chains 300, 60 are stressed in their flexible direction during the pushing movement toward the storage and retrieval end face 11.

After the detachable connection has been created, the gripping assemblies 30, 40 are moved in the X direction toward and over the storage and retrieval end face 11 and the piece good 2 is finally moved onto a storage surface 3 or another location within a storage device, for example on a conveyor belt or a retrieval chute.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A gripper for moving piece goods, comprising:

a deposit table extending in a first horizontal direction and a second horizontal direction orthogonal to the first horizontal direction, with at least one storage and retrieval end face extending in the second horizontal direction;

a gripping assembly guide arrangement arranged above the deposit table and having a first gripping assembly which extends in the first horizontal direction and is movable in the first horizontal direction and has an end portion remote from the gripping assembly guide arrangement and an end portion close to the gripping assembly guide arrangement;

the first gripping assembly comprising:

a first deflection device, a first guide portion extending in the first horizontal direction and a second guide portion; and, a first unilaterally flexible chain which interacts with the first deflection device and has a plurality of chain links with a chain link length, the first unilaterally flexible chain comprising a bending limitation device which limits pivoting of the chain links relative to one another in a first articulation direction and allows it in a second articulation direction, and the first unilaterally flexible chain having a first end remote from the gripping assembly guide arrangement and a second end close to the gripping assembly guide arrangement, wherein the first unilaterally flexible chain is movable by a drive and configured to be deflected by the deflection device in the second articulation direction at an angle of between 70°-110° to the first horizontal direction, wherein the first unilaterally flexible chain is arranged in such a way that, when the first gripping assembly is moved in the first horizontal direction, pushing forces can be transmitted to a piece good to be moved onto the deposit table, and wherein the first unilaterally flexible chain comprises an alignment device which, in a non-articulated state, holds the chain links in a mutually non-pivoted, stretched alignment and secures them against pivoting in the second articulation direction.

2. The gripper of claim 1, wherein the alignment device of the first unilaterally flexible chain is a spring element that extends through the chain and presses the chain links in the first articulation direction against the bending limitation device.

3. The gripper of claim 1, wherein the alignment device is formed by a plurality of latching arms with latching lugs and latching receptacles, wherein a latching arm of one chain link is configured to interact with a latching receptacle of an adjacent chain link and interacting latching arms and latching receptacles align corresponding chain links in a stretched manner, and wherein the second guide portion is configured to cause adjacent chain links to lock.

4. The gripper of claim 1, wherein the first deflection device is arranged at the end portions of the first gripping assembly that are remote from the gripping assembly guide arrangement.

5. The gripper of claim 1, wherein the first deflection device is configured to be moved in the first horizontal direction by a drive.

6. The gripper of claim 1, further comprising a second gripping assembly, the second gripping assembly having a receiving device configured to be detachably connected to the first end of the first unilaterally flexible chain in such a way that a pushing force is transmitted to a piece good when the first and second gripping assemblies are moved in the first horizontal direction toward the storage and retrieval end face.

7. The gripper of claim 6, wherein the receiving device is arranged at the end portions of the first gripping assembly that are remote from the gripping assembly guide arrangement.

8. The gripper of claim 6, wherein the first deflection device is configured to be moved in the first horizontal direction by a drive.

9. The gripper of claim 6, wherein the receiving device is configured to be moved in the first horizontal direction by a drive.

10. The gripper of claim 6, wherein the receiving device of the second gripping assembly comprises an opening for receiving the first end of the first chain, the opening having a depth greater than a chain link length.

11. The gripper of claim 6, wherein the receiving device is provided by a first end of a second unilaterally flexible chain which interacts with a second deflection device and is configured to be moved by a second chain drive and can be deflected by the second deflection device at an angle of between 70°–110° to the first horizontal direction, as a result of which the first end of the second chain is configured to be moved into a space between the first and second gripping assemblies and the first ends of the chains are configured to be detachably interconnected such that a pushing force is transmitted to the storage and retrieval end face when the first and second gripping assemblies are moved in the first horizontal direction.

12. The gripper of claim 1, wherein the first gripping assembly having a deflection device at the end portion remote from the gripping assembly guide arrangement has a further deflection device at the end portion close to the gripping assembly guide arrangement, with a unilaterally flexible chain being deflectable from the first horizontal direction at an angle <90° by the further deflection device, as a result of which the second end of a chain is configured to be moved over the deposit table.

13. A method for moving piece goods onto a gripper, the method comprising:

moving the gripper toward a storage surface associated with a piece good to be retrieved;

moving a first gripping assembly in a first horizontal direction toward the storage surface so that the piece good is arranged next to the first gripping assembly;

moving a first unilaterally flexible chain by a first associated chain drive in such a way that a first end of the first unilaterally flexible chain is extended by a first deflection device remote from a gripping assembly guide arrangement at an angle of between 70°–110° to a first horizontal direction, wherein adjacent chain links of the first unilaterally flexible chain downstream of the first deflection device remote from the gripping assembly guide arrangement are brought into a mutually non-pivoted, stretched alignment so that a stretched portion of the first unilaterally flexible chain is moved behind the piece good in such a way that the piece good is arranged between the stretched portion of the first unilaterally flexible chain and a deposit table;

moving the first gripping assembly in the first horizontal direction toward the storage surface, with the stretched portion of the first unilaterally flexible chain pushing the piece good onto the deposit table;

moving a second gripping assembly in the first horizontal direction toward the storage surface so that the piece good is arranged between the first and second gripping assemblies;

connecting the first end of the first unilaterally flexible chain to a receiving device of the second gripping assembly in such a way that pushing forces are transmitted to the piece good when the first and second gripping assemblies are moved in the first horizontal direction toward the storage and retrieval end face; and moving the first and second gripping assemblies in the first horizontal direction toward the deposit table so that the piece good is pushed onto the deposit table of the gripper.

14. The method of claim 13, further comprising:

detaching the first end of the first unilaterally flexible chain from the receiving device of the second gripping assembly;

moving the first deflection device and the receiving device toward end portions of the first and second gripping assemblies that are close to the gripping assembly guide arrangement;

moving the first end of the first unilaterally flexible chain into a space between the first and second gripping assemblies;

connecting the first end of the first unilaterally flexible chain to the receiving device of the second gripping assembly in such a way that pushing forces are transmitted to the piece good when the first and second gripping assemblies are moved in the first horizontal direction toward the storage and retrieval end face; and moving the first and second gripping assemblies in the first horizontal direction over the storage and retrieval end face so that the piece good is moved from the deposit table of the gripper.

15. The method of claim 13, wherein detachably connecting the first end of the first unilaterally flexible chain to the receiving device of the second gripping assembly comprises:

moving a second unilaterally flexible chain by a second associated chain drive in such a way that a first end of the second unilaterally flexible chain is moved into a space between the first and second gripping assemblies by a second deflection device remote from the gripping assembly guide arrangement; and interconnecting the first ends of the first and second unilaterally flexible chains in such a way that a pushing force is transmitted when the first and second gripping assemblies are moved in the first horizontal direction toward the storage and retrieval end face.

16. The method of claim 15, further comprising:

detaching the first ends of the first and second unilaterally flexible chains;

moving the first and second deflection devices toward end portions of the first and second gripping assemblies that are close to the gripping assembly guide arrangement;

moving the first ends of the first and second unilaterally flexible chains into a space between the first and second gripping assemblies;

interconnecting the first ends of the first and second unilaterally flexible chains in such a way that a pushing force is transmitted when the first and second gripping assemblies are moved in the first horizontal direction toward the storage and retrieval end face; and moving the first and second gripping assemblies in the first horizontal direction over the storage and retrieval end face so that the piece good is moved from the deposit table of the gripper.

17. The method of claim 16, further comprising:

retracting the first ends of the first and second unilaterally flexible chains after being detached; and guiding, by third and fourth deflection devices, second ends of the first and second unilaterally flexible chains into the space between the first and second gripping assemblies when the first ends of the first and second unilaterally flexible chains are retracted.

18. The method of claim 16, further comprising:

retracting the first ends of the first and second unilaterally flexible chains after being detached; and guiding, by third and fourth deflection devices, second ends of the first and second unilaterally flexible chains into the space between the first and second gripping assemblies after the first and second deflection devices are moved toward the end portions of the first and second gripping assemblies that are close to the gripping assembly guide arrangement.

19. A gripper for moving piece goods, comprising:

a deposit surface having a storage and retrieval end face;

a gripping assembly guide arrangement arranged above the deposit surface and movable along a first movement direction relative to the deposit surface;

a gripping assembly coupled to the gripping assembly guide arrangement, the gripping assembly comprising:

a deflection device;

a first guide portion extending in the first movement direction;

a second guide portion; and a flexible chain configured to interact with the deflection device, the flexible chain comprising:

a plurality of chain links each having a chain link length;

a bending limitation device configured to limit pivoting of the plurality of chain links relative to one another in a first articulation direction and to allow pivoting of the plurality of chain links relative to one another in a second articulation direction;

a first end remote from the gripping assembly guide arrangement;

a second end close to the gripping assembly guide arrangement; and an alignment device configured to hold two or more of the plurality of chain links in a mutually non-pivoted, stretched alignment and secured against pivoting in the second articulation direction, wherein the flexible chain is movable by a drive and configured to be deflected by the deflection device in the second articulation direction at an angle of between 70°-110° to the first movement direction, wherein when the gripping assembly is moved in the first movement direction, the flexible chain is configured to move a piece good onto the deposit surface.

* * * * *